(12) United States Patent
Leopold et al.

(10) Patent No.: US 9,703,293 B2
(45) Date of Patent: Jul. 11, 2017

(54) AIRCRAFT STALL PROTECTION SYSTEM

(71) Applicant: THE BOEING COMPANY, Chicago, IL (US)

(72) Inventors: David Daniel Leopold, Seattle, WA (US); Douglas Lee Wilson, Mercer Island, WA (US); Nikos Damian Mills, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/840,483

(22) Filed: Aug. 31, 2015

(65) Prior Publication Data

US 2017/0060141 A1   Mar. 2, 2017

(51) Int. Cl.
 *G05D 1/06* (2006.01)
 *G05D 1/08* (2006.01)
 *B64C 13/16* (2006.01)
 *B64D 31/06* (2006.01)
 *B64D 43/02* (2006.01)

(52) U.S. Cl.
 CPC ........... *G05D 1/0816* (2013.01); *B64C 13/16* (2013.01); *B64D 31/06* (2013.01); *B64D 43/02* (2013.01); *G05D 1/0607* (2013.01); *G05D 1/0825* (2013.01)

(58) Field of Classification Search
 CPC .. G05D 1/0816; G05D 1/0607; G05D 1/0825; B64C 13/16; B64D 31/06; B64D 43/02
 USPC ........................................................... 701/8
 See application file for complete search history.

(56) References Cited

U.S. PATENT DOCUMENTS

| | | | | |
|---|---|---|---|---|
| 3,181,812 | A * | 5/1965 | Dixson | G01C 21/165 244/3.18 |
| 3,654,443 | A * | 4/1972 | Dendy | B64D 43/02 701/3 |
| 3,791,208 | A * | 2/1974 | Miller | G05D 1/0607 73/180 |
| 4,110,605 | A * | 8/1978 | Miller | G01M 1/127 701/124 |

(Continued)

FOREIGN PATENT DOCUMENTS

EP   0743242 A1   11/1996

OTHER PUBLICATIONS

Extended European Search Report for EP161861562.2 dated Jan. 24, 2017.

*Primary Examiner* — Atul Trivedi
(74) *Attorney, Agent, or Firm* — Marshall, Gerstein & Borun LLP

(57) ABSTRACT

An aircraft stall protection system and method include calculating a first angle of attack and a second angle of attack based on aircraft configuration and environmental conditions, the first angle of attack being greater than the second angle of attack. The system and method limit the actual aircraft angle of attack to the first angle of attack for a predetermined period of time and thereafter the system and method limit the actual aircraft angle of attack to the second angle of attack. The system and method allow the aircraft operator or pilot to extract maximum performance from the aircraft for any given set of flight conditions, without the risk of stalling or remaining in a high drag state for a prolonged period of time. This system and method are suitable for use in conjunction with a stall warning system.

26 Claims, 3 Drawing Sheets

(56) References Cited

U.S. PATENT DOCUMENTS

| | | | | |
|---|---|---|---|---|
| 6,246,929 | B1 | 6/2001 | Kaloust | |
| 7,693,617 | B2* | 4/2010 | Dockter | B63B 35/50 244/158.4 |
| 9,058,040 | B2* | 6/2015 | Blechen | G05D 1/0623 |
| 9,217,643 | B1* | 12/2015 | Belenkii | G01S 5/16 |
| 9,315,255 | B2* | 4/2016 | Weber | B64C 5/06 |
| 2003/0015032 | A1* | 1/2003 | Glenney | G05D 1/0204 73/180 |
| 2008/0071431 | A1* | 3/2008 | Dockter | B63B 35/50 701/3 |
| 2008/0119970 | A1* | 5/2008 | Campbell | G05D 1/0676 701/8 |
| 2010/0200704 | A1* | 8/2010 | Berens | B64C 9/16 244/76 A |
| 2012/0104184 | A1* | 5/2012 | Weber | B64C 5/06 244/76 C |
| 2012/0248260 | A1* | 10/2012 | Krogh | G05D 1/0607 244/76 R |
| 2012/0318929 | A1* | 12/2012 | Golling | B64D 39/00 244/203 |
| 2013/0338859 | A1* | 12/2013 | Yamasaki | B64C 13/16 701/3 |
| 2014/0230539 | A1* | 8/2014 | Perju | G01P 13/025 73/180 |
| 2014/0253348 | A1 | 9/2014 | Maeda et al. | |
| 2015/0032299 | A1* | 1/2015 | Puyou | G05D 1/0676 701/16 |
| 2015/0083855 | A1* | 3/2015 | Moser | B64C 9/16 244/1 N |
| 2015/0084792 | A1* | 3/2015 | Barth | B64D 43/02 340/966 |
| 2016/0231137 | A1* | 8/2016 | Krogh | G05D 1/0676 |
| 2016/0298985 | A1* | 10/2016 | Genito | G01C 23/00 |

* cited by examiner

AIRCRAFT STALL PROTECTION SYSTEM

FIELD

The invention relates to aircraft stall protection systems, more specifically, to aircraft stall protection systems that calculate two different maximum angles of attack and that limit the aircraft angle of attack to the at least two different maximum angles of attack at different times.

BACKGROUND

Generally, aircraft have attached flow or unstalled flight regions and separated flow or stalled flight regions.

In the attached flow flight region, fluid (air) flowing over the flight control surfaces behaves in a predictable and expected manner and thus control surfaces can be manipulated to control the flight path and orientation of the aircraft as it flies through the air. In fixed wing aircraft, the attached flow flight region includes angles of attack (which is the angle of incidence formed between the chord line of an airfoil and the relative wind) of the wing and horizontal stabilizer that are below a stall angle of attack. The stall angle of attack is the angle of attack at which significant separation of the fluid (air) occurs over the wing of the aircraft. At the stall angle of attack, the wing no longer generates sufficient lift to maintain level flight and the fluid flowing over control surfaces (ailerons, elevators, etc.) is no longer sufficient to allow the control surfaces to generate adequate forces to control the aircraft. As a result, the control surfaces are no longer effective in controlling the aircraft's orientation and flight path. The angles of attack beyond the stall angle of attack are generally referred to as the stalled region.

Generally, it is undesirable to operate an aircraft in the stalled flight region. To preclude operation in this region, many regulatory authorities (such as the Federal Aviation Administration (FAA) in the United States) require that the subject aircraft demonstrate sufficient stall warning margin and effectiveness. To satisfy the regulatory stall warning requirements, many aircraft manufacturers employ stall warning systems. Stall warning systems provide visual, audible, and/or tactile indications to the pilot that the aircraft is approaching the stall angle of attack. Stall warning systems do not affect the pilot control of the aircraft, and as such, the pilot may elect to ignore the stall warning system and command the aircraft into the stall (or uncontrolled) flight region.

Stall protection systems, on the other hand, prevent the aircraft from entering the stalled flight region by taking control of at least some of the flight control surfaces from the pilot and actuating the flight control surfaces to maintain the aircraft in the region below the stall angle of attack. Generally, stall protection systems prevent the aircraft angle of attack from exceeding the stall angle of attack so that the wing retains predictable lift characteristics and pilot manipulation of the control surfaces remains effective, with the exception that manipulation of the control surfaces that would cause the airplane to exceed the stall angle of attack is prevented.

Aircraft that employ stall protection systems are typically certified through a Special Condition Issue Paper process (in the U.S.), since the traditional stall requirements cannot be assessed. Some regulatory agencies (such as the FAA) may give aircraft manufacturers performance relief credits for installing stall protection systems, which can result in competitive advantages during the aircraft certification process. For example, traditional operating speed margins based on stall speed in icing conditions are not required, which results in improved takeoff and landing performance. However, while existing stall protection systems prevent aircraft excursions into the uncontrolled flight region, they do not necessarily maximize aircraft performance and pilot input can actually lead to a more rapid depletion of aircraft energy than is desired. Aircraft that have implemented stall protection systems have generally removed traditional stall warning systems and replaced the stall warning demonstrations with stall robustness demonstrations.

SUMMARY

In one aspect, a method of controlling an aircraft in high angles of attack comprises measuring an actual angle of attack for an aircraft, calculating a short term maximum angle of attack, calculating a long term maximum angle of attack, calculating an activation angle of attack, determining if the actual angle of attack is greater than the activation angle of attack, limiting the actual angle of attack to the short term angle of attack, evaluating whether predetermined criteria are met, and limiting the actual angle of attack to the long term angle of attack if the predetermined criteria are met.

In further accordance with the foregoing first aspect, a method of controlling an aircraft in the approach to stall flight region may further include any one or more of the following preferred forms.

In one preferred form, the long term maximum angle of attack is less than the short term maximum angle of attack, and in another preferred form, the short term maximum angle of attack is less than or equal to a stall angle of attack.

In yet another preferred form, the long term maximum angle of attack is coincident with a ceiling of an aircraft operational envelope or a predetermined angle of attack associated with optimum aerodynamic performance.

In yet another preferred form, the activation angle of attack is less than the short term maximum angle of attack and the activation angle of attack is less than or equal to the long term maximum angle of attack.

In yet another preferred form, predetermined criteria are dependent on one or more of aircraft configuration, aircraft state, environmental flight conditions, control inputs, and time, and the aircraft configuration may be determined from inputs from one or more of a flap position sensor, a slat position sensor, a landing gear position sensor, a speedbrake position sensor, a gross weight sensor or calculation, a center of gravity sensor or calculation, and system settings that depend upon environmental conditions, such as anti icing or deicing systems.

In yet another preferred form, the aircraft state may depend on one or more of an aircraft angle of attack, an aircraft pitch angle, an aircraft bank angle, an aircraft airspeed or Mach number, an aircraft load factor, an aircraft pitch rate of change, and an aircraft angle of attack rate of change.

In yet another preferred form, environmental flight conditions may depend on one or more of temperature and altitude.

In yet another preferred form, control inputs may depend on one or more of a thrust setting, a control interceptor position, and a control interceptor force.

In yet another preferred form, the maximum angle of attack of the aircraft may be limited by a combination of longitudinal and lateral control surface movements.

In a second and third aspect, a system and aircraft comprise a stall protection processor operatively coupled to a memory, the stall protection processor executing software that accomplishes the method of the first aspect, at least one aircraft configuration sensor operatively coupled to the stall protection processor, the aircraft configuration sensor providing aircraft configuration data to the stall protection processor, at least one altitude sensor operatively coupled to the stall protection processor, the at least one altitude sensor providing altitude data to the stall protection processor, at least one temperature sensor operatively coupled to the stall protection processor, the at least one temperature sensor providing temperature data to the stall protection processor.

The features, functions, and advantages that have been discussed can be achieved independently in various embodiments or may be combined in yet other embodiments further details of which can be seen with reference to the following description and drawings.

DESCRIPTION

Figure 1:
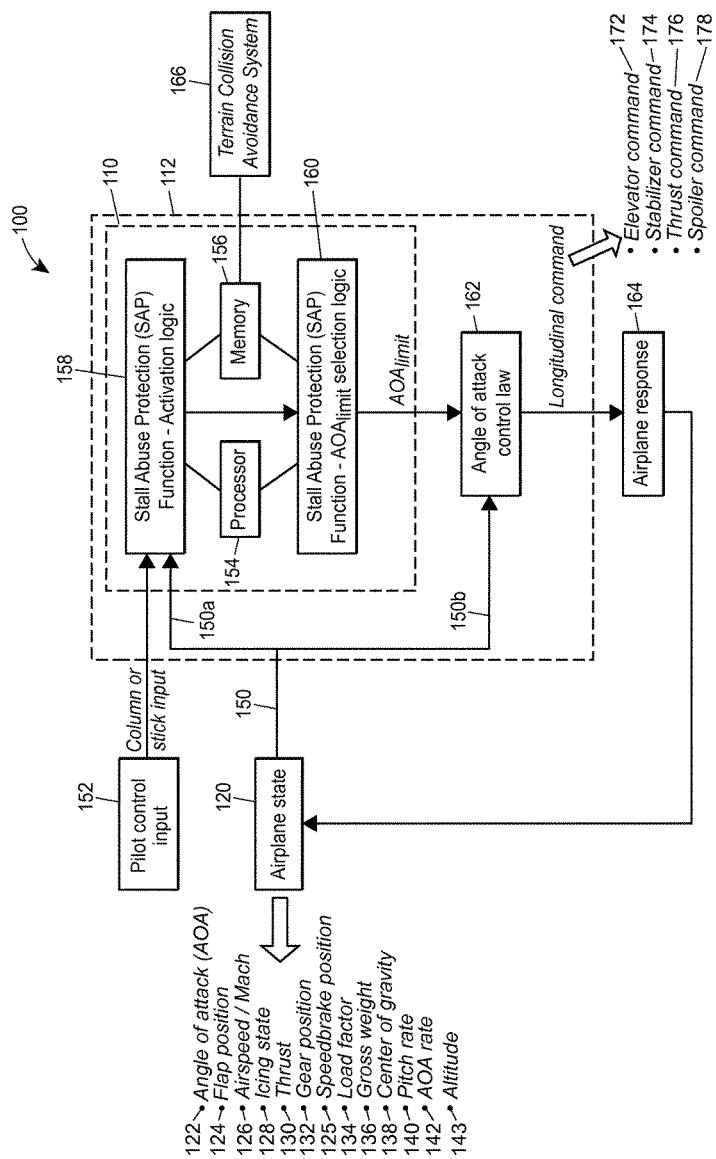
FIG. 1 is a schematic diagram of an aircraft stall protection system constructed in accordance with the disclosure.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

As used herein, the term "angle of attack" is hereby defined to mean the angle formed between the mean chord line of a wing or other selected reference line on the airplane and the relative wind.

As used herein, the term "icing conditions" is hereby defined to mean any atmospheric condition in which the aircraft ice detection equipment indicates the potential for ice to accumulate on the aerodynamic surface or the actual detection of ice on the aerodynamic surfaces.

As used herein, the term "alpha CLmax" is hereby defined to mean the angle of attack at which the aircraft generates maximum lift for a given aircraft configuration and airspeed. The term "alpha CLmax" also means the angle of attack that generates the maximum lift coefficient, which is equal to the highest point on an angle of attack vs. coefficient of lift graph.

As used herein, the term "alpha stall" is hereby defined to mean the angle of attack at which the aircraft enters the stall region of flight. The term "alpha stall" shall include all angles of attack greater than the angle of attack at which the aircraft enters an aerodynamic stall.

As used herein, the term "approach to stall region" is hereby defined to mean any angle of attack prior to alpha CLmax but greater than normal operational angles of attack.

As used herein, the term "primary flight control surface" is hereby defined to mean any flight control surface that is activated from a yoke, control stick, or pedal on the flight deck of an aircraft. The term "primary flight control surface" shall include ailerons, elevators, rudders, and spoilers.

The term "secondary flight control surface" is hereby defined to mean any flight control surface that is not activated from a yoke, control stick, or pedal on the flight deck of an aircraft. The term "secondary flight control surface" shall include the stabilizer, trailing edge flaps, leading edge devices, such as leading edge flaps or leading edge slats, and flight spoilers or speed brakes.

The term "wing" is hereby defined to mean the airfoils attached to the aircraft that generate a majority of the lift needed for flight.

The term "horizontal stabilizer" is hereby defined to mean the airfoils attached to the aircraft that balance any airplane pitching moment.

Referring to FIG. 1 a stall protection system 100 is illustrated that limits an aircraft to a short term maximum angle of attack, or first angle of attack ($\alpha1$), for a first period of time and that limits the aircraft to a long term maximum angle of attack, or second angle of attack ($\alpha2$) for a second period of time after predetermined criteria are met. The stall protection system 100 advantageously prevents sustained aircraft excursion into the uncontrolled region of flight based on predetermined criteria and then transitions to a more energy efficient angle of attack, which is below alpha CLmax, when a second set of predetermined criteria are satisfied to reduce the loss of aircraft energy (airspeed and/or altitude) while the aircraft is operated in the approach to stall region.

Generally, the stall protection system 100 includes a stall protection computer 110, which is part of or associated with the flight control computer (FCC) 112. The FCC 112 manipulates the primary and secondary flight control surfaces of an aircraft. In some embodiments, the stall protection computer 110 may be incorporated into the autopilot system. In other embodiments, the stall protection computer 110 may be integrated into the flight management system (FMS) of an aircraft, which may include the flight control computer (FCC) 112. In yet other embodiments, the stall protection computer 110 may be a separate device that communicates with the FCC 112. IN the embodiment illustrated in FIG. 1, the stall protection computer 110 is encompassed by the FCC 112.

The stall protection system 100 determines an aircraft flight state 120, which includes one or more of an angle of attack 122 (which may be received from an angle of attack sensor or an estimate from the FCC), a secondary flight control surface position, such as a flap position 124 or speedbrake position 125 (which may be received from a flap or speedbrake sensor), airspeed or mach number 126 (which may be received from an airspeed or mach indicator), icing conditions 128 (which may include one or more ice detectors as well as static air temperatures and/or total air temperatures received from temperature sensors), thrust 130 (which may include throttle position received from a throttle position sensor), landing gear position 132 (which may be received from a landing gear sensor), a load factor 134 (which may be received from inertial sensors), aircraft gross weight 136 (which may be received from the FCC, or estimated), aircraft center of gravity 138 (which may also be received from the FCC or estimated), aircraft pitch rate 140 (which may be received from internal sensors), an angle of attack rate of change 142 (which may be received from an angle of attack sensor), and altitude 143 (which may be received from a barometric altimeter, a radio altimeter, or a global positioning system altimeter).

The airplane state 120 may be received by the stall protection computer 110 via a communication link 150. The communication link 150 may comprise a wired or a wireless communication link 150a between the stall protection computer 110 and the various sensors listed above and a wired or a wireless communication link 150b between the FCC 112 and the various sensors listed above.

The stall protection computer 110 also receives input from the control column or stick 152 in the flight deck.

The stall protection computer 110 comprises a processor 154 and a memory 156 that is operatively coupled to the processor 154. The memory 156 stores activation logic 158 and selection logic 160. The activation logic 158 and the selection logic 160 are accessible and executable by the processor 154. The activation logic 160, which will be further described with respect to FIG. 2, determines when the aircraft state exceeds a predetermined activation angle of attack ($\alpha 3$). If the aircraft state 120 exceeds the predetermined activation angle of attack ($\alpha 3$), the stall protection computer 110 proceeds to calculate the first maximum angle of attack ($\alpha 1$) and the second maximum angle of attack ($\alpha 2$) with the selection logic 160, which will be further described with respect to FIG. 3.

Once the first maximum angle of attack ($\alpha 1$) and the second maximum angle of attack ($\alpha 2$) have been calculated or selected, the stall protection computer 110 sends the first maximum angle of attack ($\alpha 1$) and the second maximum angle of attack ($\alpha 2$) to an angle of attack control law 162 in the FCC 112 so that the FCC 112 generates commands (such as an elevator command 170, a stabilizer command 172, a thrust command 174, and/or a spoiler command 175) which then activate flight control surfaces to maintain the aircraft state at or below either the first maximum angle of attack ($\alpha 1$) or the second maximum angle of attack ($\alpha 2$), according to the selection logic 160. After activating flight control surfaces, the aircraft will react to the changes in the flight control surfaces, resulting in an aircraft response 164, which is recorded in an updated aircraft state 120 by the various sensors described above. Optionally, a terrain collision avoidance system 166 may be operatively connected to the stall protection computer 110 to provide terrain information to the stall protection computer 110, which aids in selection of an appropriate time period for the first maximum angle of attack ($\alpha 1$).

Figure 2:
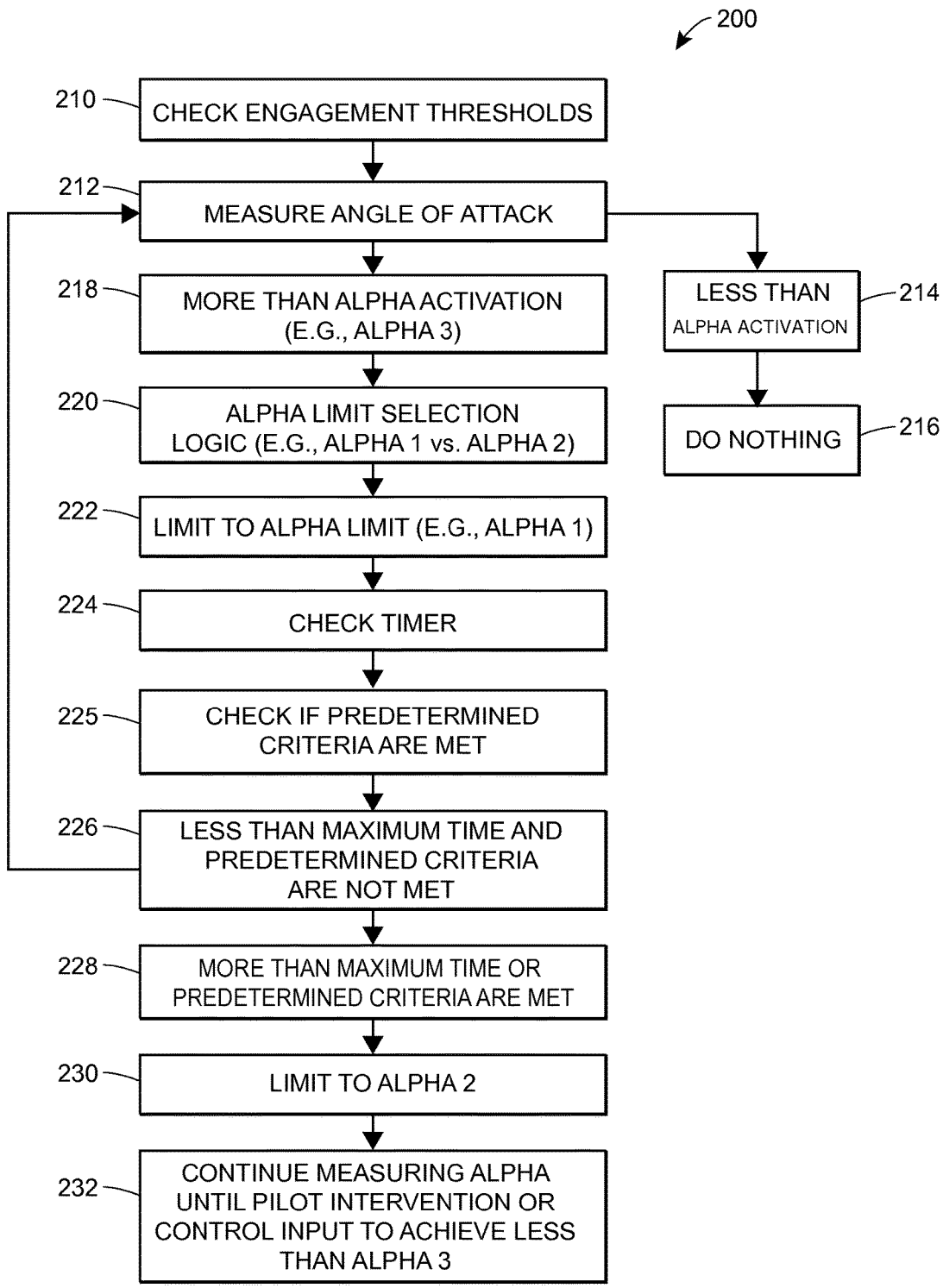
FIG. 2 is a diagram of activation logic that may be used by the system of FIG. 1.

Turning now to FIG. 2, one embodiment of activation logic 200 is illustrated, which may be executed by the stall protection computer 110. Generally, the activation logic 200 begins with exceeding certain engagement thresholds at 210. Engagement thresholds may include an airspeed limit or an angle of attack limit. If the engagement thresholds are exceeded by the aircraft, the stall protection computer 110 executes the activation logic 200. After activation, the aircraft angle of attack is measured at 212. If the aircraft angle of attack is below the predetermined activation angle of attack at 214, and if the angle of attack rate of change is low (e.g., the angle of attack is changing by less than 5° per second), the activation logic 200 does not proceed any further and terminates at 216 because the aircraft is not operating in the approach to stall region or there is ample time for the pilot to intervene to prevent aircraft excursion into the approach to stall region.

If the aircraft angle of attack is greater than the predetermined activation angle of attack at 218, or if the angle of attack is close to the activation angle of attack ($\alpha 3$) and the rate of change is sufficiently high (e.g., the angle of attack is changing by more than 5° per second), the activation logic 200 instructs the processor to proceed to the selection logic (which will be further described with respect to FIG. 3), which determines the first maximum angle of attack ($\alpha 1$) and the second maximum angle of attack ($\alpha 2$) at 220. Once the first and second maximum angles of attack have been determined by the selection logic at 220, the activation logic 200, when executed by the processor 154 of the stall protection computer 110, sends a command to the FCC 112 (FIG. 1) at 222 to activate flight controls to limit the aircraft angle of attack to the first maximum angle of attack ($\alpha 1$) (e.g., to limit the aircraft angle of attack to alpha stall in one embodiment).

After sending the command at 222, the processor 154 checks a timer at 224 and the processor 154 checks predetermined criteria (such as airspeed and/or angle of attack and/or flight path angle) at 225 to see if any of the predetermined criteria are met. If the timer is less than a predetermined maximum time (e.g., less than 10 seconds, preferably less than 8 seconds, and more preferably less than 5 seconds) at 226, and if the predetermined criteria are not met at 225, the processor 154 returns to step 212 and measures the angle of attack of the aircraft. If, however, the timer is more than the predetermined maximum, or if the predetermined criteria are met, at 228, the processor 154 sends a command to the FCC 112 at 230 to limit the aircraft angle of attack to the second maximum angle of attack ($\alpha 2$) (which may be the angle of attack for maximum performance in one embodiment). The processor 154 may also update the activation angle of attack ($\alpha 3$) to maintain a margin to the second maximum angle of attack ($\alpha 2$). The FCC 112 may send activation commands to one or more actuators of the flight control surfaces (both primary flight controls and secondary flight controls), which are not illustrated in the figures, but which are understood by one having ordinary skill in the art to exist on all aircraft, to command the flight control surfaces to move in a desired manner to prevent the aircraft from exceeding the second maximum angle of attack ($\alpha 2$). Actuators of the flight control surfaces may include mechanical actuators, hydraulic actuators, electric actuators, pneumatic actuators, or any combination thereof. The processor 154 then continues measuring the angle of attack of the aircraft and pilot control column inputs at 232 until the aircraft angle of attack is below the activation angle of attack ($\alpha 3$), or until pilot intervention is detected (which is indicated by a control column input that commands a decrease in angle of attack), at which point the activation logic 200 terminates.

When executing the activation logic 200, the processor 154 commands the FCC 112 to limit the aircraft angle of attack to first maximum angle of attack ($\alpha 1$) for a predetermined maximum time period, which prevents the aircraft from entering the stalled region of flight. This advantageously enhances the safety of flight by preventing a stall while allowing the aircraft manufacturer to realize the performance advantages granted by regulatory authorities.

Thereafter, the activation logic 200 commands the FCC 112 to limit the aircraft angle of attack to the second maximum angle of attack (α2) until the aircraft is no longer operating in the approach to stall region, which advantageously maximizes the aircraft energy state, which then may be used to avoid terrain or obstacles for the maximum time possible. For example, during a microburst, the pilot may pull full aft on the control column or stick, thereby commanding a flight condition that would exceed the stall angle of attack. The stall protection system 100 prevents the aircraft angle of attack from exceeding the first maximum angle of attack (α1), which prevents operation in the stall region of flight for a first (short) period of time. This short period of time would allow the pilot to assess the situation and determine the best course of action for an escape. After the first (short) period of time expires, the stall protection system 100 transitions to the second maximum angle of attack (α2), which maximizes the aircraft energy state to allow the pilot the maximum amount of time to execute the escape maneuver, thereby avoiding the terrain or obstacle. In other words, the disclosed stall protection system 100 combines both stall protection and maximum aircraft performance into a single system.

Figure 3:
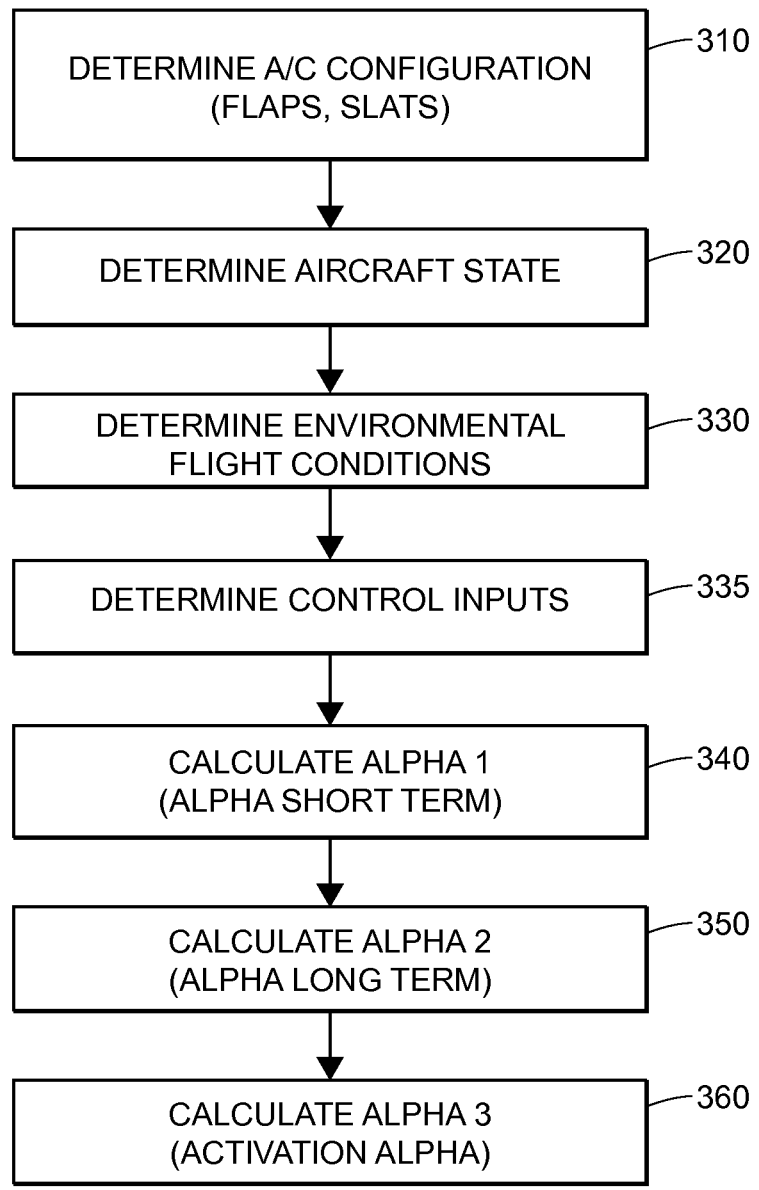
FIG. 3 is a diagram of angle of attack selection logic that may be used by the system of FIG. 1.

Turning now to FIG. 3, one embodiment of the selection logic 300 is illustrated. Initially, when executed on the processor 154, the selection logic 300 determines the aircraft configuration at 310. For example, the selection logic 300 may receive inputs from the gear indicator (to determine gear position), from the flap indicator (to determine leading and/or trailing edge flap or slat position), from the thrust levers (to determine available thrust), from airspeed or mach indicator (to determine airspeed or mach number), from the aircraft icing instruments (to determine presence of ice), from the speedbrake lever or indicator (to determine speedbrake position), from the FMC or the FCC (to determine center of gravity and/or aircraft weight), and from the angle of attack indicator (to determine angle of attack or rate of change for the angle of attack). At 320, the selection logic 300 determines the aircraft state (including configuration and flight condition). The aircraft state may be used to modify the transition from the first maximum angle of attack (α1) to the second maximum angle of attack (α2). The selection logic also measures control column forces and locations at 335 to assess pilot or autopilot inputs. The selection logic 300 uses the inputs from steps 310-335 to calculate the first maximum angle of attack (α1) at 340 and the second maximum angle of attack (α2) at 350. An activation angle of attack (α3) is calculated or predetermined at 360. The first maximum angle of attack (α1), the second maximum angle of attack (α2), and the activation angle of attack (α3) are then used by the stall protection system 110, as described above.

In all cases, the second maximum angle of attack (α2) will be less than the first maximum angle of attack (α1) because the angle of attack that produces maximum performance is always less than the angle of attack at CLmax.

In the examples described above, the predetermined criteria (before transitioning to the second maximum angle of attack (α2)) may be altitude dependent because transitioning to the second maximum angle of attack (α2) is more critical at lower altitudes because the aircraft energy state is lower at lower altitudes, thus it is more important to conserve energy at lower altitudes.

Example Embodiment

In one embodiment, a subset of the stall abuse protection function settings may be determined based on the following factors. α1 may be based on the landing configuration to be coincident with the alpha associated with an aerodynamic stall. For this embodiment α1 is determined to be 18°. α2 is determined to be coincident with the ceiling of the operational flight envelope which is coincident with the activation of the stall warning system. For this embodiment α2 is determined to be 14°. For this embodiment α3 is determined to be coincident with α2. In other embodiments, α3 may be less than α2. A predetermined logic is utilized to determine the transition between α1 and α2, the predetermined logic may be based on measuring the actual angle of attack to be at least equivalent to α1 and then by monitoring the longitudinal control being measured against the aft stop for a duration of at least 2 seconds. In other embodiments, the transition may be based simply on the duration of a stall warning; for instance, if a stall warning remains active for at least 5 seconds then the system transitions the limit command from α1 to α2.

A first scenario may be encountered when a pilot reacts to a situation while in the landing configuration on final approach by applying aft longitudinal control input in an attempt to achieve a desired pitch attitude, or in an attempt to maintain a certain glide path to the runway. Such a pilot input may occur during a change in wind direction or speed, such as during a wind shear encounter. In this situation, the pilot may apply constant aft longitudinal control that has not reached the aft stop. As a result of this control input, the measured angle of attack increases beyond α3 and the actual pitch attitude increases beyond the intended attitude resulting in overshoot of both pitch and angle of attack. This overshoot results in the activation of the stall abuse protection function which limits the actual angle of attack to α1. The stall abuse protection function will cease to limit the actual angle of attack once the pilot is envisioned to respond to the active stall warning by reducing the actual angle of attack below α3 through manual relaxation of the longitudinal control aft pressure or position.

A second scenario may be encountered when a pilot reacts to a situation while in the landing configuration on final approach resulting in the application of an abrupt and sustained aft longitudinal control input to the aft limit. Such a control input may be experienced during a microburst or other downdraft. As a result of this unintentional or intentional control input, the measured angle of attack increases beyond α3 resulting in the activation of the stall abuse protection function which first limits the actual angle of attack to α1. The predetermined transition to the α2 limit is then activated resulting in the actual angle of attack being limited to α2 thereby managing the total energy of the aircraft in a more efficient and safe manner consistent with pilot training and procedures. The stall abuse protection function will cease to limit the actual angle of attack once the measured angle of attack is less than the activation alpha α3 through manual relaxation of the longitudinal control aft pressure or position.

In the embodiments described above, the first maximum angle of attack (α1) is generally equal to alpha CLmax and the second maximum angle of attack (α2) is generally equal to alpha for maximum performance. However, the first and second maximum angles of attack (α1, α2) may be different in other embodiments.

In some embodiments, the actual angle of attack (α) is limited using a combination of aircraft longitudinal and lateral controls.

In other embodiments, the aircraft configuration may be determined from inputs from one or more position sensors and the system settings dependent upon environmental flight conditions may be determined based on the presence of ice or icing conditions.

In yet other embodiments, the first maximum angle of attack ($\alpha 1$) may be somewhat greater than alpha CLmax, and the actual angle of attack ($\alpha$) is limited to prevent large excursions beyond the angle of attack for an aerodynamic stall.

The system described above advantageously allows the aircraft operator or pilot to extract maximum performance from the aircraft for any given set of flight conditions, without the risk of stalling the aircraft or operating in a high drag condition for an extended period of time. As a result, the system allows the pilot to maintain the maximum amount of aircraft energy for the longest period of time, which may be necessary to avoid terrain or other obstacles during low altitude flight. Moreover, the system described above controls the aircraft in a manner that is consistent with current pilot training philosophy and allows pilots to use current warnings and procedures while maintaining stall protection. The system described above also retains the advantageous features provided by a conventional stall warning system.

While the description above relates generally to manual control of an aircraft by a pilot, the description could apply equally as well to automatic control of an aircraft by an autopilot.

While various embodiments have been described above, this disclosure is not intended to be limited thereto. Variations can be made to the disclosed embodiments that are still within the scope of the appended claims.

What is claimed is:

1. A method of controlling an aircraft at high angles of attack, the method comprising:
    measuring an actual angle of attack ($\alpha$) for an aircraft;
    calculating a short term alpha ($\alpha 1$);
    calculating a long term alpha ($\alpha 2$);
    calculating an activation alpha ($\alpha 3$);
    determining if the actual angle of attack ($\alpha$) is greater than $\alpha 3$;
    limiting the actual angle of attack ($\alpha$) to the short term alpha ($\alpha 1$) by activating at least one of an elevator, a stabilizer, a thrust lever, and a spoiler;
    evaluating if a predetermined criteria has been met; and
    limiting the actual angle of attack ($\alpha$) to the long term alpha ($\alpha 2$), by activating at least one of an elevator, a stabilizer, a thrust lever, and a spoiler, if the predetermined criteria have been met.

2. The method of claim 1, wherein the short term alpha ($\alpha 1$) is equal to or less than alpha stall.

3. The method of claim 1, wherein the long term alpha ($\alpha 2$) is less than the short term alpha ($\alpha 1$).

4. The method of claim 3, wherein the long term alpha ($\alpha 2$) may be coincident with the ceiling of the aircraft operational envelope or a predetermined angle of attack associated with optimum aerodynamic performance.

5. The method of claim 1, wherein the activation alpha ($\alpha 3$) is less than the short term alpha ($\alpha 1$).

6. The method of claim 5, wherein the activation alpha ($\alpha 3$) may be less than, equal to, or greater than the long term alpha ($\alpha 2$).

7. The method of claim 1, wherein the predetermined criteria are dependent upon aircraft configuration, aircraft state, environmental flight condition, control input and time.

8. The method of claim 7, wherein the aircraft configuration is dependent upon flap position, landing gear position, speedbrake position, gross weight, center of gravity, and system settings dependent upon environmental flight conditions.

9. The method of claim 7, wherein the aircraft state is dependent upon the angle of attack, pitch angle, bank angle, airspeed, Mach, load factor, pitch rate, and angle of attack rate.

10. The method of claim 7, wherein the environmental flight condition is dependent upon temperature and altitude.

11. The method of claim 7, wherein the control input is dependent upon thrust, control inceptor position, and control inceptor force.

12. The method of claim 11, wherein the control input is initiated at the activation alpha ($\alpha 3$).

13. The method of claim 11, wherein the control input includes moving one or more aircraft longitudinal and lateral controls.

14. The method of claim 1, wherein the short term alpha ($\alpha 1$) is determined based on aircraft configuration, aircraft state, and environmental flight condition.

15. The method of claim 1, wherein the long term alpha ($\alpha 2$) is determined based on aircraft configuration, aircraft state, and environmental conditions.

16. The method of claim 1, wherein the activation alpha ($\alpha 3$) is determined based on one of the short term alpha ($\alpha 1$), the long term alpha ($\alpha 2$), or other predefined calculations based on aircraft state.

17. A system for limiting the angle of attack of an aircraft approaching high angles of attack, the system comprising:
    a stall protection processor operatively coupled to a memory;
    at least one aircraft configuration sensor operatively coupled to the stall protection processor, the aircraft configuration sensor providing aircraft configuration data to the stall protection processor;
    at least one altitude sensor operatively coupled to the stall protection processor, the at least one altitude sensor providing altitude data to the stall protection processor;
    at least one temperature sensor operatively coupled to the stall protection processor, the at least one temperature sensor providing temperature data to the stall protection processor; and
    a software program stored in the memory and executable on the processor, the software program including a first routine that calculates a short term alpha ($\alpha 1$), a long term alpha ($\alpha 2$) and an activation alpha ($\alpha 3$), the short term alpha ($\alpha 1$) being greater than the long term alpha ($\alpha 2$) and the activation alpha ($\alpha 3$) being less than, equal to, or greater than the long term alpha ($\alpha 2$),
    wherein the stall protection processor instructs a flight control computer to limit the actual aircraft angle of attack to the short term alpha ($\alpha 1$), by activating at least one of an elevator, a stabilizer, a thrust lever, and a spoiler, for predetermined maximum period of time and the stall protection processor instructs the flight control computer to limit the actual aircraft angle of attack to the long term alpha ($\alpha 2$), by activating at least one of an elevator, a stabilizer, a thrust lever, and a spoiler, after the predetermined maximum period of time has expired or a separate predetermined criteria has been met.

18. The system of claim 17, wherein the short term alpha ($\alpha 1$) is equal to or less than alpha stall.

19. The system of claim 17, wherein the long term alpha ($\alpha 2$) is equal to the ceiling of the aircraft operational envelope or a predetermined angle of attack associated with optimum aerodynamic performance.

20. The system of claim 17, wherein the activation alpha (α3) is less than the first maximum angle of attack (α1).

21. The system of claim 17, wherein the short term alpha (α1), long term alpha (α2), and activation alpha (α3) are calculated based on aircraft configuration, aircraft state, and environmental flight condition.

22. The system of claim 17, wherein the at least one aircraft configuration sensor comprises one or more of an angle of attack indicator, a flap position indicator, a slat position indicator, an airspeed indicator, an icing indicator, a thrust lever position indicator, a gear position indicator, a speed brake position indicator, a gross weight indicator, a load factor indicator, a center of gravity position indicator, a pitch rate indicator, a bank angle indicator, and an angle of attack rate indicator.

23. The system of claim 17, wherein the altitude sensor comprises one or more of a barometric altitude sensor and a radio altimeter sensor.

24. The system of claim 17, wherein the temperature sensor comprises one or more of a static air temperature sensor and a total air temperature sensor.

25. The system of claim 17, further comprising a terrain collision avoidance system that is operatively connected to the stall protection processor, the terrain collision avoidance system providing terrain data to the stall protection processor.

26. An aircraft including an angle of attack limiting system, the aircraft comprising:
   a flight control computer coupled to an elevator actuator, to a stabilizer actuator, to a thrust actuator, and to a spoiler actuator;
   a stall protection processor operatively coupled to a memory and operatively coupled to the flight control computer;
   at least one aircraft configuration sensor operatively coupled to the stall protection processor, the aircraft configuration sensor providing aircraft configuration data to the stall protection processor;
   at least one altitude sensor operatively coupled to the stall protection processor, the at least one altitude sensor providing altitude data to the stall protection processor;
   at least one temperature sensor operatively coupled to the stall protection processor, the at least one temperature sensor providing temperature data to the stall protection processor; and
   a software program stored in the memory and executable on the processor, the software program including a first routine that calculates a short term alpha (α1), a long term alpha (α2), and an activation alpha (α3), the short term alpha (α1) being greater than the long term alpha (α2) and activation alpha (α3),
   wherein the stall protection processor instructs the flight control computer to actuate one or more of the elevator actuator, the stabilizer actuator, the thrust actuator, and the spoiler actuator to limit the actual aircraft angle of attack to the short term alpha (α1) for a predetermined maximum period of time, and the stall protection processor instructs the flight control computer to actuate one or more of the elevator actuator, the stabilizer actuator, the thrust actuator, and the spoiler actuator to limit the actual aircraft angle of attack to the long term alpha (α2) after the predetermined maximum period of time has expired.

* * * * *